Figure 1:
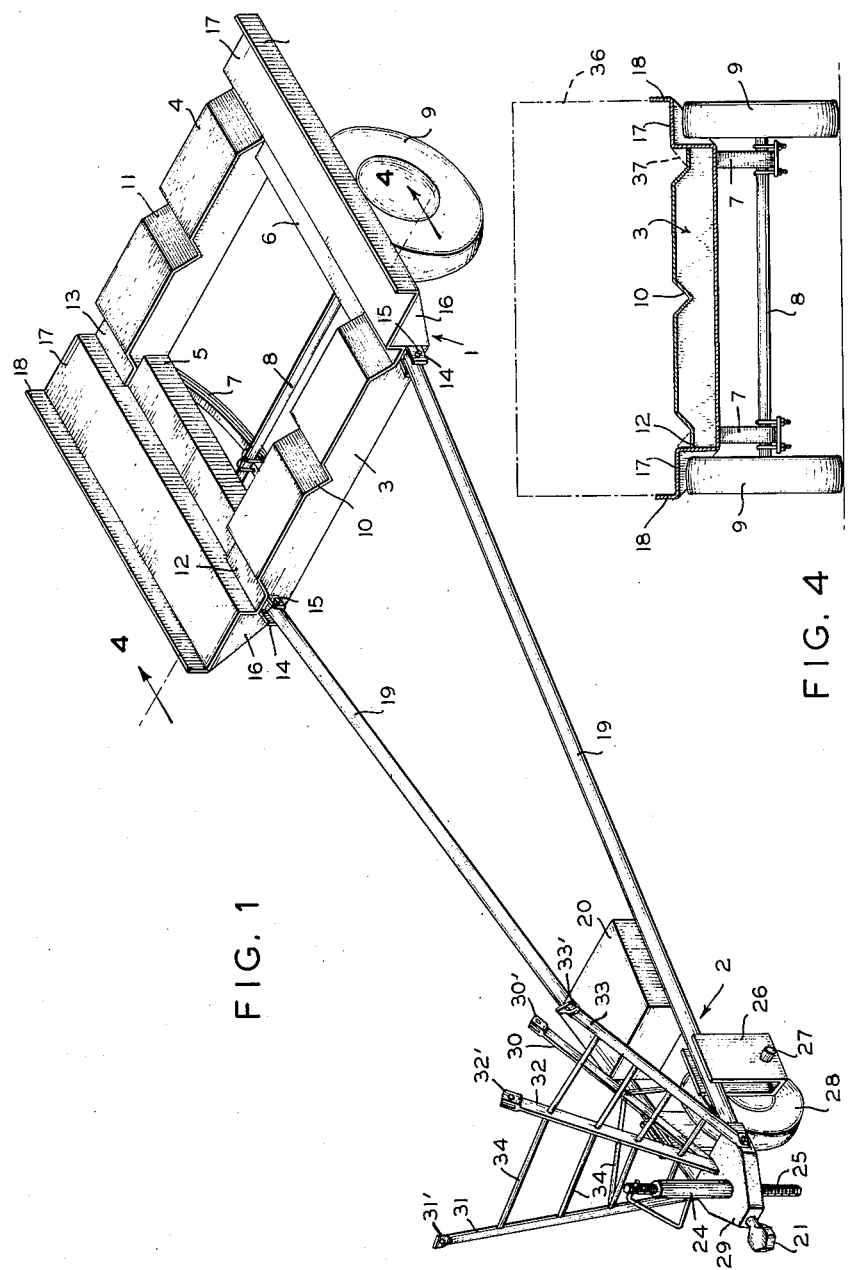

Oct. 17, 1961  J. B. MOORE, JR  3,004,771
FLOATABLE TRAILER

Filed May 27, 1958  2 Sheets-Sheet 1

INVENTOR,
JAMES B. MOORE, JR.
BY
ATTORNEY

Oct. 17, 1961   J. B. MOORE, JR   3,004,771
FLOATABLE TRAILER
Filed May 27, 1958   2 Sheets-Sheet 2
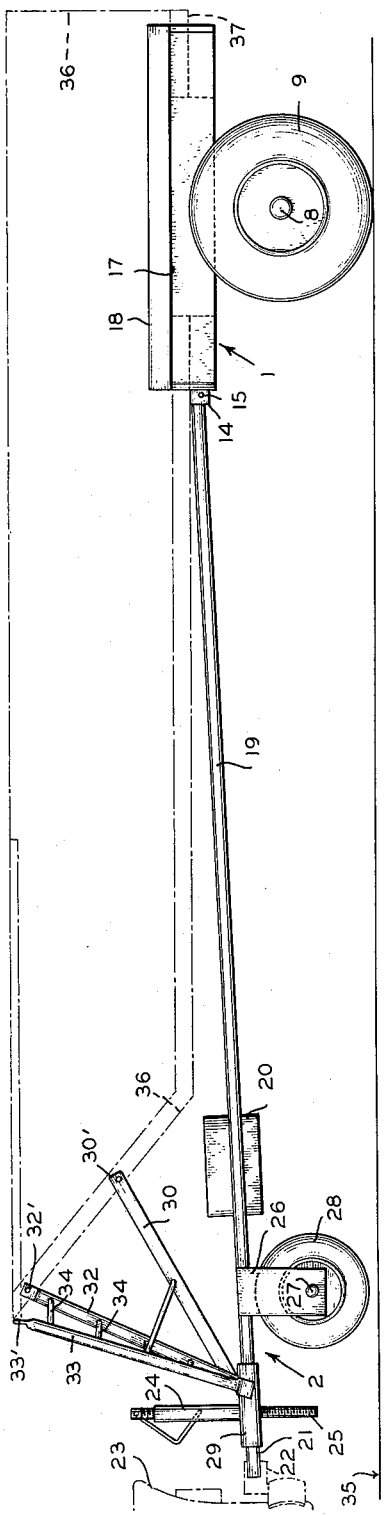
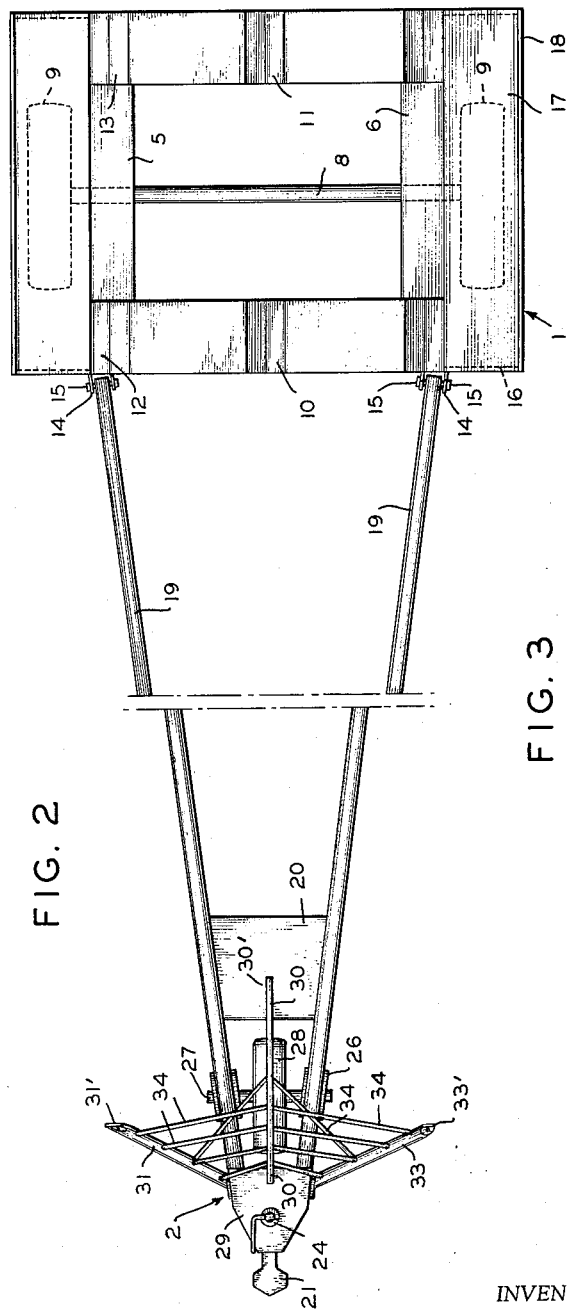
FIG. 2
FIG. 3
INVENTOR,
JAMES B. MOORE, JR.
BY
ATTORNEY

United States Patent Office 3,004,771
Patented Oct. 17, 1961

3,004,771
FLOATABLE TRAILER
James Bashford Moore, Jr., P.O. Box 1109,
Lexington, Ky.
Filed May 27, 1958, Ser. No. 738,194
6 Claims. (Cl. 280—414)

The present invention relates to a trailer for boats and other floatable bodies and more particularly to a floatable trailer for transporting a boat to a body of water for launching the boat into a body of water and for removing the boat from said body of water.

The trailer of the present invention is particularly adaptable to be used with a boat such as described in copending application Ser. No. 738,179, now abandoned, filed concurrently herewith on May 27, 1958.

According to one aspect of the present invention, there is provided a floatable trailer for a boat, the trailer including a boat supporting platform comprising a hollow frame and wheel means mounted on said frame for conveying said trailer on land. More particularly, the frame comprises a plurality of hollow beams arranged to form a generally rectangular frame. The frame is defined by spaced longitudinal hollow beams joined by spaced transverse hollow beams with the longitudinal beams having transverse or lateral extensions thereon for cooperating with the hollow beams to define the boat supporting platform.

In the preferred form of the invention the transverse beams have at the upper surface thereof a plurality of depressions defining channels for receiving keel-like ribs on the bottom of the boat.

The trailer preferably includes a forward coupling section which is spaced from and secured to the rear boat supporting platform. The forward coupling section includes coupling means for securing the trailer to the vehicle for hauling the trailer on land, a jack for raising the coupling section off the ground when attaching the coupling to the vehicle, and means, preferably a plurality of upwardly extending struts, for securing the coupling section of the trailer to an end of the boat when the boat is mounted on the trailer.

An object of the present invention is to provide a trailer which can float in water and can be easily positioned under the boat when it is desired to remove the boat from the water.

Another object of the present invention is to provide a trailer for a boat which can be made from relatively light gauge metal but still possess the rigidity and durability necessary for a trailer.

Another object is to provide a trailer which can support a boat while the boat is being transported on land, the trailer being so constructed that when transporting the boat, there are a minimum number of stresses and strains applied to the trailer structure.

These and further objects of the present invention will be readily apparent from the following description together with the accompanying drawings.

In the drawings:
FIG. 1 is a perspective view of the trailer.
FIG. 2 is a side elevation of the trailer.
FIG. 3 is a plan view of the trailer.
FIG. 4 is a cross section of the boat supporting platform taken along the line 4—4 of FIG. 1, showing the boat, in outline, supported thereon.

The trailer of the present invention comprises a rear boat supporting section 1 and a forward coupling section 2, the rear section comprising a hollow frame defined by opposed spaced hollow transverse beams 3 and 4 and opposed spaced hollow longitudinal beams 5 and 6. The beams preferably define a generally rectangular frame. On each side of the frame there is provided a longitudinal leaf spring 7 supporting an axle 8. Mounted on either end of the axle 8 is a wheel 9, said wheels preferably including pneumatic tires.

The frame includes on the upper surface thereof at least one longitudinal depression such as that defined by V-shaped depressions or recesses 10 and 11. There are included additional depressions such as 12 and 13. These depressions or recesses define channels for receiving keel-like ribs 37 on the bottom of a flat bottom boat 36 such as disclosed and claimed in the aforesaid copending application.

At the forward end of the rear boat supporting platform there are a plurality of brackets or yokes 14. Pivotally and removably mounted in these brackets are members 19 which are preferably tubular or hollow. Members 19 are secured to the brackets 14 by pins 15.

The rear section includes lateral or transverse extensions 17, the lateral extremities of these extensions including an upturned vertical portion 18. These extensions are welded or otherwise secured to the hollow frame and are further maintained in the proper position by means of brace plates 16. When the boat is supported by the trailer, the bottom of the boat rests on the hollow frame as well as the lateral extensions which extend over the wheels.

The forward section of the trailer includes a float or hollow body 20 mounted between the tubular members 19. At the forward end there is provided a mounting plate 29 on which is mounted a jack 24 and a coupling member 21. The coupling 21 may be any conventional trailer coupling which interengages another coupling member 22 mounted on the towing vehicle 23. Such trailer couplings are well known and need not be further described. The forward section also includes a wheel 28 pivotally mounted on an axle 27 which is secured to the tubular members 19 by means of U-shaped mounting 26.

When fastening or coupling the trailer to the towing vehicle 23, the jack 24 is operated in the conventional manner to lower jack rod 25 until the jack rod 25 contacts the ground 35. Upon continuing operation of the jack, the forward section of the trailer is raised until the coupling member 21 may be fastened to coupling member 22 on the towing vehicle. When the coupling members are securely fastened to each other, the operation of the jack is reversed to raise the jack rod 25 out of contact with the ground. The jack is a conventional jack and is diagrammatically illustrated.

Secured to plate 29 are a plurality of generally upwardly extending struts 30, 31, 32 and 33 each having at its end a means 30', 31', 32' and 33' respectively for removably attaching the struts to the end of the boat. These attaching means may be U-shaped as shown at 30' and 32' or merely flattened perforated ends 31' and 33'. When the boat is in position on the trailer, a pin or bolt may be slipped through the openings at the ends 30', 31', 32' and 33' and corresponding mating means on the hull 36 of the boat to firmly secure the struts to the boat.

Between the struts are a plurality of transverse bracing bars 34 which serve to maintain the strut structure relatively rigid. The struts may be tubular.

Thus, it can be seen that the trailer of the present invention, because of the presence of the float 20, the hollow frame, the tubes 19 (whose ends may be sealed off) and the pneumatic or hollow tires, is floatable. The various parts are so dimensioned that when the trailer is immersed in a body of water, the trailer will barely float. In other words, the overall specific gravity of the trailer is slightly less than that of the water.

When utilizing the trailer of the present invention, to remove the boat from the water, the trailer is rolled into the water and floated alongside the boat. Because the specific gravity of the trailer is so close to the specific gravity of the water, the trailer can be easily submerged slightly by one or two men to enable the trailer to be placed under the bottom of the boat and the trailer is then permitted to rise in the proper position underneath the boat.

The fastening means 30', 31', 32' and 33' are secured to the hull of the boat and the trailer with the boat mounted thereon is removed from the water. Because of the wheeled nature of the trailer, the trailer may be rolled onto the ground in position behind the towing vehicle and coupled thereto in the conventional manner.

Preferably the boat and the trailer are dimensioned to be used with each other. Preferably the trailer is so dimensioned that the boat supporting platform will support the boat at substantially the center of gravity thereby placing the entire weight of the boat on the wheels 9.

Because of the arrangement of the struts shown in the drawings with the strut 30 being angularly displaced rearwardly of the other struts, when the trailer is being hauled by the towing vehicle, the pull of the vehicle is applied through the coupling 22, the plate 29, and the struts 30–33 directly to the hull of the boat there being virtually no significant tension on the connecting tubes 19, and no significant weight on the hitch or coupling on the back of the towing vehicle.

In this manner the trailer can be constructed of relatively light gauge metal such as 12 or 14 gauge steel. It is evident that the weight of the boat rests directly on the hollow boat supporting platform which thus serves the dual function of supporting the boat and rendering the trailer floatable. If desired, the entire top surface of the boat supporting platform may be covered with canvas (not shown) which may be glued to the frame.

The beams defining the hollow frame are secured to each other by welding or in any conventional manner.

The above described construction results in a relatively light weight trailer which has sufficient strength to support the boat under towing conditions and also can be easily positioned under the boat or removed therefrom when the boat is in the water. The trailer may be provided with a conventional brake system (not shown) which is coupled to the towing vehicle in the conventional manner.

I claim:

1. In a floatable trailer for a boat, a rear boat supporting buoyant section, a forward buoyant coupling section, means interconnecting said sections, said rear boat supporting section comprising a hollow buoyant frame defining a boat supporting platform and wheel means mounted on said frame, said hollow frame including a plurality of fluid-tight buoyant hollow beams secured to each other, said beams being the principal buoyant members of said platform, said forward coupling section including a buoyant hollow float, wheel means, coupling means for connecting said trailer to a vehicle, and jack means to raise said wheel means off the ground during attachment of said coupling means to said vehicle, said trailer having a density approximately that of water, said interconnecting means being rigidly secured to said forward section and pivotally secured to said rear section.

2. A floatable trailer as recited in claim 1 wherein said forward coupling section includes a plurality of generally upwardly and rearwardly directed struts for detachably securing the forward section of the trailer to an end of the boat, and means near the free end of said struts for firmly securing said struts to the end of the boat.

3. A floatable trailer as recited in claim 1 wherein said fluid-tight buoyant hollow beams are secured to each other to form a generally rectangular configuration.

4. A floatable trailer as recited in claim 1 wherein said rear boat supporting section includes a plurality of transverse extensions, said extensions and said hollow beams defining said boat supporting platform.

5. A floatable trailer as recited in claim 1 wherein the upper surface of said hollow frame defines at least one longitudinal channel for receiving a keel-like rib on the bottom of the boat.

6. A floatable trailer as recited in claim 1 wherein said means interconnecting said sections comprises a plurality of elongated hollow members.

References Cited in the file of this patent

UNITED STATES PATENTS

| | | |
|---|---|---|
| 1,755,537 | Deisler | Apr. 22, 1930 |
| 2,361,951 | Livermon | Nov. 7, 1944 |
| 2,503,535 | Yarbrough | Apr. 11, 1950 |
| 2,644,176 | Livermon | July 7, 1953 |
| 2,669,480 | Messick | Feb. 16, 1954 |
| 2,719,044 | Walter | Sept. 27, 1955 |
| 2,759,201 | McKinney | Aug. 21, 1956 |
| 2,823,817 | Holsclaw | Feb. 18, 1958 |
| 2,848,243 | Young | Aug. 19, 1958 |